United States Patent
Kalouche et al.

(10) Patent No.: US 12,233,438 B2
(45) Date of Patent: *Feb. 25, 2025

(54) ROBOTIC SYSTEM HAVING SHUTTLE

(71) Applicant: Nimble Robotics, Inc., San Francisco, CA (US)

(72) Inventors: Simon Kalouche, San Francisco, CA (US); Kevin Kruempelstaedter, Edina, MN (US)

(73) Assignee: Nimble Robotics, Inc., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/514,538

(22) Filed: Nov. 20, 2023

(65) Prior Publication Data
US 2024/0165671 A1    May 23, 2024

Related U.S. Application Data

(63) Continuation of application No. 17/723,960, filed on Apr. 19, 2022, now Pat. No. 11,850,633, which is a
(Continued)

(51) Int. Cl.
*B25J 9/00* (2006.01)
*B07C 3/00* (2006.01)
(Continued)

(52) U.S. Cl.
CPC ............... *B07C 3/008* (2013.01); *B07C 3/08* (2013.01); *B07C 5/36* (2013.01); *B25J 9/0093* (2013.01); *B25J 9/1612* (2013.01); *B25J 9/1679* (2013.01); *B25J 9/1697* (2013.01); *B25J 15/0616* (2013.01); *B65G 1/0492* (2013.01); *B65G 1/1376* (2013.01); *B65G 1/1378* (2013.01); *B65G 2203/0233* (2013.01); *B65G 2203/044* (2013.01); *G05B 2219/45063* (2013.01)

(58) Field of Classification Search
CPC ... B07C 3/008; B07C 3/08; B07C 5/36; B25J 9/0093; B25J 9/1612; B25J 9/1679; B25J 9/1697; B25J 15/0616; B25J 9/023; B25J 15/0014; B65G 1/0492; B65G 1/1376; B65G 1/1378; B65G 2203/0233; B65G 2203/044; B65G 47/904; B65G 47/915; G05B 2219/45063; G05B 2219/40153; G05B 2219/40155; G05B 2219/40174; G05B 2219/40195; G05B 2219/40391
See application file for complete search history.

(56) References Cited

U.S. PATENT DOCUMENTS

8,997,438 B1    4/2015 Fallas
9,760,086 B2 *  9/2017 Woodtli ............... B65G 1/0492
(Continued)

*Primary Examiner* — Thomas Randazzo
(74) *Attorney, Agent, or Firm* — POLSINELLI PC (57) ABSTRACT

A robotic system includes a robot having a picking arm to grasp an inventory item and a shuttle. The shuttle includes a platform adapted to receive the inventory item from the picking arm of the robot. The platform is moveable in at least a two-dimensional horizontal plane between a pick-up location located substantially adjacent to the robot and an end location spaced a distance apart from the pick-up location. The system improves efficiency as transportation of the item from the pick-up location to the end location is divided between the robot and the shuttle.

20 Claims, 9 Drawing Sheets

Related U.S. Application Data continuation of application No. 16/720,466, filed on Dec. 19, 2019, now Pat. No. 11,318,499.

(51) Int. Cl.

| | |
|---|---|
| *B07C 3/08* | (2006.01) |
| *B07C 5/36* | (2006.01) |
| *B25J 9/08* | (2006.01) |
| *B25J 9/16* | (2006.01) |
| *B25J 15/06* | (2006.01) |
| *B65G 1/04* | (2006.01) |
| *B65G 1/137* | (2006.01) |

(56) References Cited

U.S. PATENT DOCUMENTS

| | | | |
|---|---|---|---|
| 9,785,911 B2 | 10/2017 | Galluzzo et al. | |
| 9,940,604 B2 | 4/2018 | Galluzzo et al. | |
| 9,975,148 B2 * | 5/2018 | Zhu | B07C 3/18 |
| 10,017,285 B2 | 7/2018 | Boudreau et al. | |
| 10,052,662 B2 * | 8/2018 | Harrer | B07C 3/082 |
| 10,086,998 B1 * | 10/2018 | Tilekar | B65G 1/1373 |
| 10,147,069 B2 | 12/2018 | Galluzzo et al. | |
| 10,217,074 B1 | 2/2019 | Stallman et al. | |
| 10,322,506 B2 | 6/2019 | Ding et al. | |
| 11,318,499 B2 * | 5/2022 | Kalouche | B07C 3/008 |
| 11,850,633 B2 * | 12/2023 | Kalouche | B25J 9/023 |
| 2010/0300048 A1 * | 12/2010 | Krizmanic | B65G 1/1378 53/558 |
| 2013/0207811 A1 * | 8/2013 | Yagawa | G08B 23/00 340/691.6 |
| 2013/0341254 A1 | 12/2013 | Bauer et al. | |
| 2014/0180958 A1 | 6/2014 | Arunapuram et al. | |
| 2015/0032252 A1 | 1/2015 | Galluzzo et al. | |
| 2015/0073589 A1 * | 3/2015 | Khodl | B25J 5/007 700/218 |
| 2017/0050803 A1 * | 2/2017 | Arnold | B65G 1/1373 |
| 2017/0080566 A1 | 3/2017 | Stubbs et al. | |
| 2017/0088355 A1 * | 3/2017 | Khodl | B65G 1/1375 |
| 2017/0137232 A1 * | 5/2017 | Messner | B65G 47/70 |
| 2017/0157649 A1 | 6/2017 | Wagner et al. | |
| 2017/0260008 A1 | 9/2017 | DeWitt et al. | |
| 2018/0037412 A1 | 2/2018 | Lynch et al. | |
| 2018/0148272 A1 | 5/2018 | Wagner et al. | |
| 2018/0312336 A1 | 11/2018 | Wagner et al. | |
| 2018/0318881 A1 | 11/2018 | Hayduchok et al. | |
| 2018/0346247 A1 | 12/2018 | DeWitt et al. | |
| 2019/0062055 A1 | 2/2019 | Hance et al. | |
| 2019/0256292 A1 | 8/2019 | Grasmueck et al. | |
| 2019/0268479 A1 | 8/2019 | Montgomery | |
| 2019/0291955 A1 * | 9/2019 | Bastian | B65G 1/1373 |
| 2019/0369600 A1 | 12/2019 | Lager | |
| 2020/0039747 A1 * | 2/2020 | Ahmann | B65G 1/1375 |
| 2020/0039748 A1 * | 2/2020 | Khodl | G06Q 10/087 |
| 2020/0094997 A1 * | 3/2020 | Menon | B65B 35/54 |
| 2020/0160011 A1 | 5/2020 | Wagner et al. | |
| 2020/0172334 A1 * | 6/2020 | Yamashita | B65G 1/065 |
| 2020/0223066 A1 | 7/2020 | Diankov et al. | |
| 2020/0223635 A1 * | 7/2020 | Govindaswamy | B65G 1/1375 |
| 2020/0269283 A1 * | 8/2020 | Ulrich | B07C 3/008 |
| 2020/0306973 A1 * | 10/2020 | Edwards | B25J 9/1694 |
| 2020/0316786 A1 * | 10/2020 | Galluzzo | B25J 9/162 |
| 2020/0407178 A1 * | 12/2020 | Battles | B65G 1/0478 |
| 2021/0001489 A1 * | 1/2021 | Peterson | G06Q 10/08 |
| 2021/0371200 A1 * | 12/2021 | Thorhallsson | B25J 9/023 |
| 2022/0048707 A1 | 2/2022 | Mati et al. | |

* cited by examiner

ROBOTIC SYSTEM HAVING SHUTTLE

CROSS-REFERENCE TO RELATED APPLICATIONS

This application is a continuation of U.S. application Ser. No. 17/723,960, filed on Apr. 19, 2022, which is a continuation of U.S. application Ser. No. 16/720,466, filed on Dec. 19, 2019, the disclosure of which is incorporated herein by reference.

BACKGROUND OF THE INVENTION

The present disclosure relates to robotic systems, and more particularly, to a system including a robot and a shuttle device for picking and/or sorting items within fulfillment centers.

Warehouses, or e-commerce fulfillment centers, require systems that enable the efficient storage, retrieval and shipment of a large number of diverse products. Inventory is typically stored in containers and arranged on rows of shelving on either side of an aisle. Each container holds a plurality of items of one or more product types. The aisles provide access between the shelving for a human or robot to migrate the aisles and retrieve the desired products.

Orders are commonly retrieved from the shelving in one of a three ways: order picking, batch picking, or wave picking. Order picking and batch picking are processes that include selecting individual items from the warehouse inventory to satisfy one or more independent orders. Traditionally, order picking and batch picking involve a human navigating through the aisles of the warehouse to retrieve each item of the order and placing those items directly into individual order containers, which are subsequently packaged and shipped to the consumer. For large warehouses that handle hundreds, or even thousands of orders a day, order picking and batch picking are labor-intensive, expensive and inefficient processes as they often require the picker to travel large distances to retrieve the items before the individual order is packaged for shipment. Wave picking, on the other hand, is the process of simultaneously picking inventory for multiple orders. Wave picking thus minimizes the total distance in which the picker must travel to retrieve the items for a given number of orders. After the items have been picked, however, wave picking typically requires that the items be transported to a sorting location where a sorter subsequently consolidates and sorts the items into individual order containers.

The sorter may be a human or a machine such as a robot. In situations where the sorter is a robot, the robot grasps individual items from a picking location, identifies the grasped item and places the item into one of several sorting locations, thereby automating the sorting process. In some instances, the robot may be a machine learning robot. Machine learning is the process by which a computer performs or succeeds at one or more related tasks as defined by a measure, and after exposure to information characterizing an event, learns and improves under the measure at performing the one or more related tasks.

While robots are generally efficient at performing a single task, such as repeatedly grasping an item of a single product type that is oriented in a specific direction, robots are not currently adept at recognizing and grasping items of varying sizes, dimensions, shapes, weights and stiffness. When robots have been tasked with recognizing and grasping inventory items of varying sizes and properties, items can unintentionally slip from the robot's gripping mechanism before the item is placed in its desired order container, which is typically spaced a substantial distance from the picking location. When this occurs, human intervention is required. Furthermore, when a single robot is tasked with completing the entire sorting process (e.g., recognizing a particular item, grasping the item, verifying the item is the correct item, verifying the correct order container and placing the item in the desired order container), the process can be quite time consuming and require that the robotic arm travel long distances between the picking location and each of the processing/sorting locations. For these reasons, robots are not widely utilized in warehouses that ship inventory of varying product types.

Therefore, there is a need for further improvements to the known robotic systems to automate the picking and/or sorting of wave picked inventory.

BRIEF SUMMARY OF THE INVENTION

In accordance with a first aspect of the present invention, a robotic system is provided for picking and sorting inventory. In one embodiment, the system includes a robot having a picking arm to grasp an inventory item and a shuttle including a platform adapted to receive the inventory item from the picking arm of the robot. The platform is moveable between a pick-up location located substantially adjacent to a picking area and one of several end locations spaced a distance apart from the pick-up location. Among other advantages, the system improves reliability because the items are transferred from the picking arm to the platform at the pick-up location (adjacent the robot), and thus, if an item is unintentionally dropped, it will either fall back into the picking area (e.g., bin, chute, etc.) or onto the platform. In either scenario, human intervention will not be required. Moreover, the simple construction of the shuttle allows the items to be efficiently sorted in a manner that is significantly cheaper than a system including several robots equipped with picking arms.

In another embodiment, a robotic system can include a robot having a picking arm that is selectively operable between autonomous and teleoperator modes, a processor to instruct the robot, a teleoperator interface communicatively coupled to the robot and a storage device communicatively coupled to the processor. The storage device may include a a machine leaning grasp pose prediction algorithm which prompts the at least one processor to: 1) predict one or more grasping poses; 2) select at least one of the one or more grasping poses; and 3) execute the selected one or more grasping poses which causes the picking arm of the robot to autonomously perform the selected one or more grasping pose. The system may further include a sensor communicatively coupled to the robot and the processor to characterize the at least one grasping pose as a successful grasp or an unsuccessful grasp. Upon the successful grasp characterization, the picking arm autonomously moves and releases the item, and upon the unsuccessful characterization, the sensor transmits an unsuccessful grasp signal to the processor, which in turn, communicates with the teleoperator interface. If necessary, a human operating the teleoperator interface can manually pilot the grasping of the target item or the robot can attempt to grasp the object again autonomously. The robot can then learn from the teleoperator demonstrated poses to automate future grasping of similarly situated items.

A method for picking and sorting inventory items is also provided. In one embodiment, the method includes, grasping a first item using a picking arm of a robot, placing the item on a platform of a shuttle device, moving the platform from a pick-up location (located adjacent to a picking area) to an end location spaced apart from the pick-up location, displacing the item at the end location, moving the platform from the end location back to the pick-up location, and grasping a second item using the picking arm of the robot. The second item is preferably grasped prior to the platform returning to the pick-up location. As a result, the sorting throughput of the system is increased because the picking arm and the shuttle share in carrying the item from the picking area to the end location.

BRIEF DESCRIPTION OF THE DRAWINGS

Various embodiments of the present invention are described herein with reference to the drawings, wherein.

DETAILED DESCRIPTION

As used herein, when terms of orientation, for example, "vertical" and "horizontal" or relative terms such as, "above," "upwardly," "beneath," "downwardly," and alike, are used to describe the relative position or orientation of specific features of the robotic system, the terms are in reference to the positions of these features in the normal gravitational frame of reference.

Figure 1:
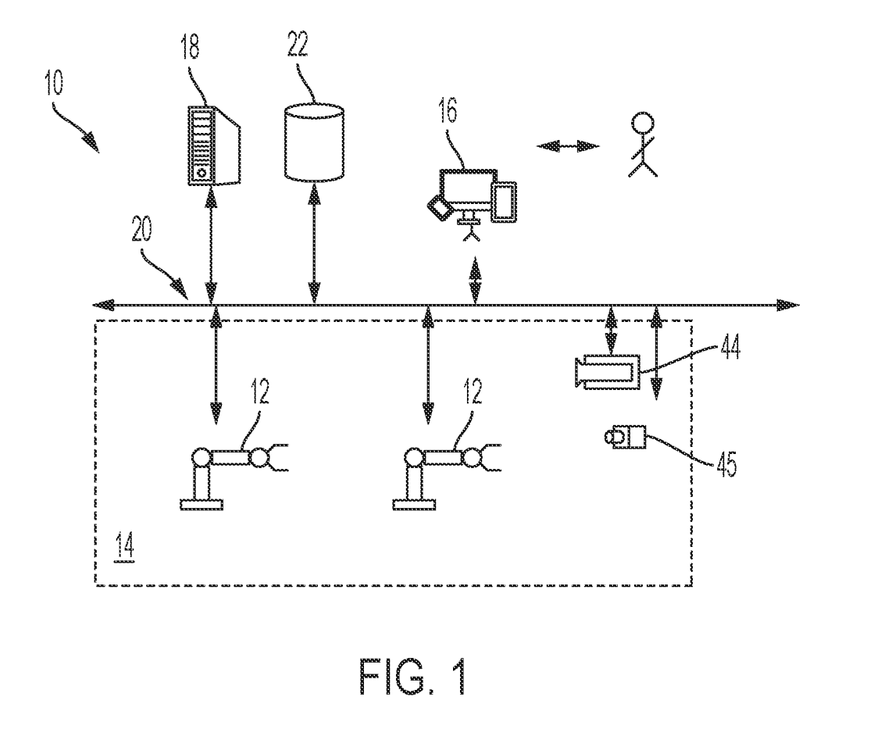
FIG. 1 is a schematic illustration of a system having a robotic picking and/or sorting station including a robot and a shuttle device in accordance with an embodiment of the present invention.

FIG. 1 is a schematic illustration of a robotic system 10 in accordance with an exemplary embodiment of the present disclosure. A robot, such as robot 12, may be housed in a warehouse or other fulfillment center 14 and tasked with picking and sorting inventory items. Robot 12 may operate in one of two modes: an autonomous mode, by executing autonomous control instructions, or a manually tele-operated mode, in which the control instructions are piloted (e.g., directly controlled) by a human operator. In one embodiment, robot 12 may be a machine learning robot capable of executing piloted control instructions. While the term "control instructions" (whether described as autonomous or piloted) are primarily described herein as instructions for grasping an item, it will be appreciated that the term may additionally refer to a variety of other robotic tasks such as the recognition of an inventory item, the placement or release of a grasped item (e.g., the placement or release of a grasped item in a particular orientation) or any other robotic task configured to assist with order fulfillment.

Figure 6:
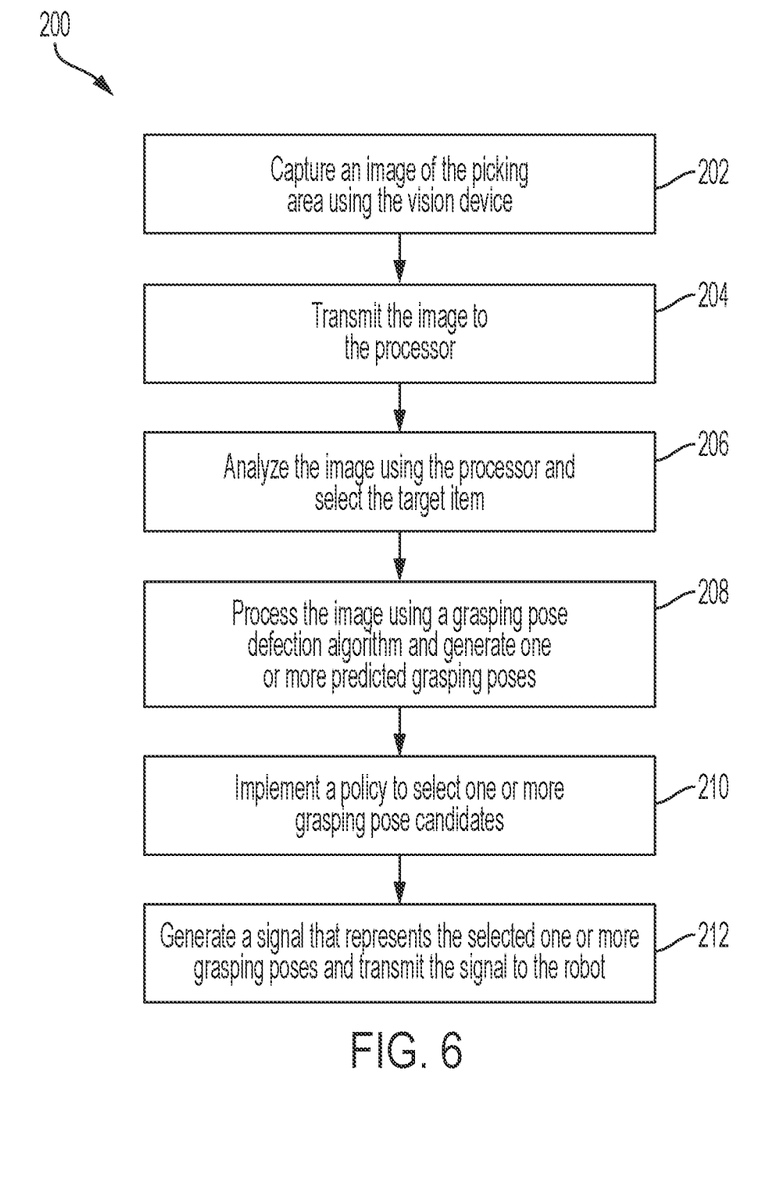
FIG. 6 is a flow chart showing a method of determining a grasping pose for the robot of FIG. 1.

As will be described in greater detail hereinafter, with respect to FIG. 6, the present system allows a teleoperator to remotely pilot robot 12 and move the robot into a variety of grasping poses (e.g., position and/or orientation and/or posture of the robotic picking arm) to train the machine learning system of the robot to better predict future autonomous robot control instructions.

Robot 12, in autonomous mode, can predict autonomous robot control instructions based on the geometry and material of an item and its specified pose (e.g., position and/or orientation and/or posture of the target item). If the robot control instructions are unsuccessful in performing a task (e.g., grasping the item), system 10 can automatically request human intervention, allowing the robot to be teleoperatively controlled from a local or remote location.

In addition to robot 12, system 10 includes one or more teleoperator interfaces 16, at least one of which may be located at a remote site outside of warehouse 14, one or more computer systems (e.g., processor-based computer systems) 18, each of which are communicatively coupled via one or more network or non-network communication channels 20, and one or more storage devices 22, which stores, for example, a machine leaning grasp pose prediction algorithm used to predict new grasping poses. While storage device 22 is illustrated as being separate from computer system 18, in at least some implementations the one or storage devices can be an integral part or component of the computer system (e.g., memory such as RAM, ROM, FLASH, registers; hard disk drives, solid state drives).

Operator interface 16 includes one or more input devices to capture control instructions from a human operator and one or more user output devices. The one or more user interface devices 16 may be, for example, a personal computer, a tablet, (smart) phone, a wearable computer, and the like. Exemplary user input devices include keyboards, mice, touch screen displays, displays (e.g., LCD or OLED screen), controllers and the like. Exemplary output devices include, without limitation, displays (e.g., LCD or OLED screen), head mounted displays, speakers, and/or haptic feedback generators (e.g., vibration element, piezo-electric actuator, rumble motor). Operator interface 16 may thus be utilized by a human operator to observe the robotic picking and/or sorting process, for example, aspects of robot 12 and the environment surrounding the robot including the picking area (e.g., the area from which the inventory items are picked). Human observer(s) may view or see a representation of robot 12 performing one or more tasks such as grasping an item by reviewing one or more still and/or moving images of robot 12 in its environment. These images and/or video may be replayed and/or viewed in real time. If robot 12 is unsuccessful at autonomously performing the task, the human operator can utilize operator interface 16 and instruct robot 12 to perform one or more robotic tasks such as grasping a target inventory item and/or releasing the target inventory item at a desired location. Although operator interface 16 is primarily designed to assist robot 12 in performing tasks that the robot is struggling to perform, such as grasping, it will be appreciated that the teleoperator can utilize the operator interface at any time (including prior to a failed grasping attempt) to manually control the robot and/or override the autonomously predicted grasping pose.

Computer system 18 facilitates and/or coordinates the operation of system 10. Computer system 18 can be a processor based computer system. The processor may be any logic processing unit, such as one or more microprocessors, central processing units (CPUs), digital signal processors (DSPs), graphics processing units (GPUs), application-specific integrated circuits (ASICs), programmable gate arrays (PGAs), programmed logic units (PLUS), and the like. In some implementations, computer system 18 may include a control subsystem including at least one processor. Computer system 18, the at least one processor and/or the control subsystem may be interchangeably referred to herein as the processor, the controller, the computer, the server or the analyzer.

Examples of a suitable network or non-network communication channels 20 include a wire based network or non-network communication channels, optical based network or non-network communication channels, wireless (i.e., radio and/or microwave frequency) network or non-network communication channels, or a combination of wired, optical, and/or wireless networks or non-network communication channels.

Although two robots 12 are illustrated in system 10, it will be appreciated that the system can include a single robot, any number of robots located within a single warehouse 14, or one or more robots located within a plurality of warehouses. System 10 is thus advantageously configured to allow one or more operators to teleoperatively pilot or control a plurality of robots 12, via one or more operator interfaces 16, from a site located local or remote to the warehouses in which the robots are contained.

Robot 12 operates in communication with communication channels 20, and thus may send and/or receive processor readable data or processor executable instructions via the communication channels. In turn, operator interface 16 receives and/or sends processor-readable data or executable instructions across communication channel 20 and creates and/or provides human readable representations of the processor readable instructions to robot 12.

Figure 2A:
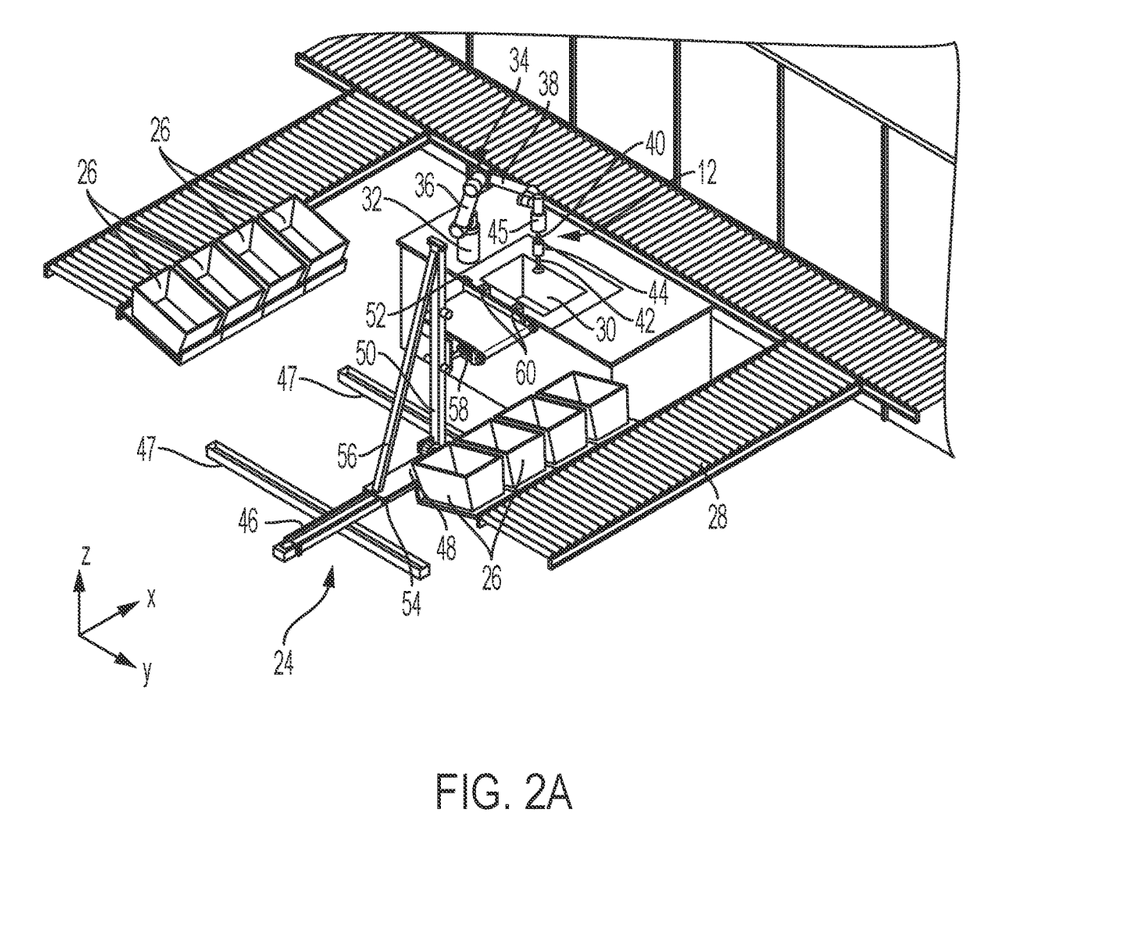
FIG. 2A is a perspective view of an exemplary robotic picking and/or sorting station schematically shown in FIG. 1.

FIG. 2A illustrates a robotic station for picking and/or sorting inventory within warehouse 14. The robotic station includes robot 12, a shuttle device 24 and a mechanism for separating inventory into individual orders 26. As depicted in FIG. 2A, the mechanism for separating inventory into individual orders may be a plurality of individual order containers. However, it will be understood that cubbies (shown in FIGS. 3 and 4), bins, boxes, bags or any other alternative mechanism known in the art may be used.

Humans, automatic storage and retrieval systems, transporter robots (not shown) or conveyer belts 28, or a combination of the same, can be used to transport the inventory from its storage location within warehouse 14 to the robotic station, and more particularly, to picking area 30. As will be explained in further detail hereinafter, robot 12 and shuttle device 24 act in concert to efficiently pick inventory from picking area 30 and sort the inventory into individual order containers 26.

Robot 12 generally includes a base 32 and a picking arm 34. In some embodiments, the base 32 of robot 12 may include wheels (not shown) or any other known mechanism for facilitating movement of the robot about warehouse 14. In other embodiments, as illustrated in FIG. 2A, the base 32 of robot 12 may be housed within a structure forming picking area 30 such that the robot is immovable. In either scenario, however, base 32 is preferably positioned adjacent to picking area 30 during a picking and/or sorting operation. Picking area 30 may be a bin, a chute or any other known apparatus configured to temporarily house inventory items for picking or sorting.

In an exemplary embodiment, picking arm 34 may include a first member 36 operably coupled to the base 32 of robot 12, a second member 38 operably coupled to the first member of the robot, and a third member 40 operably coupled to the second member and adapted to receive a gripping tool 42 such as a pneumatic gripping tool. First member 36 may be operably connected to the base 32 of robot 12 via a first motor (not shown) which drives rotation of the first member about the base of the robot in the x-plane, and a second motor (not shown) which drives rotation of the first member about the base of the robot in the y-plane. Second member 38 may be operably connected to first member 36 via a third motor (not shown) which drives rotation of the second member about the first member in a direction in the y-plane. Third member 40 may be operably connected to second member 38 via a fourth motor (not shown) which drives rotation of the third member about the second member in the z-plane, and which operates movement of gripping tool 42, either upwards or downwards, relative to picking area 30. In a preferred embodiment, third member 40 is coupled to second member 38 via a spring or another mechanism that allows the third member to exhibit passive compliance. That is, if third member 40 presses against a target item with too great a force, the third member will recoil toward second member 38 to better position picking arm 34, and in turn, gripping tool 42 relative to the target item while preventing damage to the motors, the third member and the target product. The above described exemplary configuration of picking arm 34 allows gripping tool 42 to be adjusted in any direction relative to the inventory disposed within picking area 30. It will be understood, however, that picking arm 34 may include any number of members, passive compliance mechanisms and motors and/or may exhibit alternative arrangements of the members, passive compliance mechanisms and motors, so long as gripping tool 42 is freely positionable relative to picking area 30.

Gripping tool 42 is preferably in fluid communication with a pneumatic air source. The pneumatic air source may be vacuum or a pump configured to supply compressed air. In embodiments in which the pneumatic air source is a pneumatic compressor providing compressed air, robot 12 includes a Venturi pump or similar device capable of converting the compressed air to a vacuum force to grasp the inventory items.

The third member 40 of picking arm 34 may include a ring magnet (not shown) or another magnetic arrangement that allows fluid communication through an aperture of the magnet. A magnet having an opposing polarity to the magnet of the third member may be disposed on gripping tool 42 to magnetically and removably couple the gripping tool to the end of picking arm 34. Gripping tool 42 may be a suction cup having a wall formed of a resilient material, such as rubber, with bellows and an annular groove. The wall of gripping tool 42 is therefore adapted to compress when the gripping tool engages an inventory item. Gripping tool 42 further includes a lip formed from a resilient material, which also may be a rubber, such that the lip of the gripping tool is adapted to deform and conform to a surface of the target item to create a seal between the gripping tool and the surface of the item. Gripping tool 42 may further includes a gasket, such as an O-ring, for sealing the connection created between picking arm 34 and gripping tool 42.

Gripping tool 42 may alternatively or additionally include a clamp (not shown) having a plurality of pneumatically or mechanically actuated fingers for grasping an item. The fingers can be used in combination with the suction cup or in isolation of the suction cup. In some embodiments, the fingers themselves may include suction cups. Robot 12 may include a tool holder (not shown) to assist the robot in switching one gripping tool for another gripping tool without physical human intervention (e.g., different sized suction cups and/or suction cups formed from different materials and/or between a suction cup and a clamping device). Further details of the various gripping tools 42 and the tool holder are described in detail in US Provisional Patent Application No. 62/879,843, assigned to Applicant, and hereby incorporated in its entirety herein.

One or more vision devices 44, such as a camera, video recorder, Light Detection and Ranging (LIDAR), and the like, are attached to robot 12 and oriented, for example, downwardly to capture pictures, point clouds, video etc. (generally referred to herein as "an image" or "images") of the item(s) contained in picking area 30 and characteristics including the position of gripping tool 42 within the picking area. The image(s) may then be transmitted via network or non-network communication channels 20 to processor 18 which, in turn, may additionally be relayed to operator interface 16. In this manner, processor 18 may implicitly or explicitly analyze the item pose (e.g., position and/or orientation and/or posture) of each of the items contained within the picking area 30 and based upon this information determine the next item to be picked (i.e., the target item). As will be explained in further detail hereinafter, processor 18 can then execute a machine learning algorithm, located on storage device 22, and predict grasping pose to grasp the target item, before transmitting the grasping pose control instructions to robot 12 via communication channels 20 which, when executed by the robot, causes the picking arm 34 of the robot to autonomously approach and attempt to grasp the target item. Although the grasping pose can refer to a single pose, the grasping of the target item often requires a set of consecutively run poses. As used herein, the term 'grasping pose' may refer to a single pose or a set of consecutively run poses.

Robot 12 may additionally include one or more sensors 45 communicatively coupled to processor 18 via network or non-network communication channels 20. Sensor 45 may be, for example, a pressure sensor, or any other sensor configured to detect whether the target product has been grasped by gripping tool 42. That is, sensor 45 is adapted to characterize the grasp as successful or unsuccessful and transmit this information over the network or non-network communication channels 20 to processor 18. In a preferred embodiment, a load cell may be disposed within the picking arm 34 of robot 12 to measure the weight of a grasped item. In this manner, robot 12 can instantaneously verify if the grasped item is the product that the robot initially believed it to be.

Shuttle device 24 generally includes a track 46, a base 48 that is slidable along the track, a post 50 and a platform 52 that is slidable along the post and configured to receive items from picking arm 34. Shuttle device 24 is also communicatively coupled to processor 18 via network or non-network communication channels 20, and thus, is able to be autonomously controlled by the processor.

The base 48 of shuttle device 24 may additionally include one or more rollers to assist the base in sliding along the track. Post 50 is attached to the base 48 of shuttle 24 and may be oriented in a substantially vertical direction away from the base. As shown in FIG. 2A, shuttle device 24 may optionally include a support bar 56. Although not necessary, support bar 56 may provide extra stability to post 50 by reducing the load on the post when platform 52 transports relatively heavy inventory items. Support bar 56 may include a first end attached to the base 48 of the shuttle device and a second end attached to the post 50.

Platform 52 may be directly coupled to post 50 along a track or via another mechanism that allows the platform to traverse the post in a vertical direction (e.g., move downwardly toward the base 48 of shuttle device 24 and move upwardly toward the top of post 50). An alternative exemplary mechanism, for example, may include a system of one or more belts, gears and/or screws that allow platform 52 to be controlled similar to an elevator.

In another embodiment, shuttle device 24 may optionally include one or more second tracks 47 upon which track 46 may slide. In this manner, the base 48 of shuttle device 24 is capable of movement in two directions (e.g., along track 46 (in the x-direction) and along track 47 (in the y-direction)). In yet another embodiment, platform 52 may be indirectly coupled to post 50 via an extension member 58 that moves the platform laterally relative to the post and in the y-direction. Extension member 58 may be capable of pivoting the platform from a transport position (e.g., substantially parallel with a ground surface) to a delivery position (e.g., angled downwardly toward target container 26) to displace the item from the platform and into the target container. Additionally, or alternatively, platform 52 may include a push tray, a cross-belt positioned laterally across the platform relative to post 50, bomb bay doors, or any other mechanism configured to displace the item from the platform and into a desired one of the target containers 26.

Shuttle device 24 may optionally include one or more scanners 60 communicatively coupled to processor 18 via communication channels 20. Scanners 60 are preferably located on platform 52, or otherwise positioned adjacent to picking area 30, and adapted to scan a barcode on the packaging of the inventory item to verify the identity of the item. Thus, after an item has been grasped and either before the item has been placed on platform 52 or after the item has been placed on the platform, the scanner or scanners 60 can scan the barcode, RFID or SKU and transmit this information to processor 18 which, in turn, can verify the identity of the product and control shuttle device 24 to direct the platform to dispense the item into an appropriate container, bin or cubby corresponding to a particular order.

In one embodiment, platform 52 may additionally, or alternatively, include a load measuring device such as a scale to measure the weight of an item. The load measuring device may also be communicatively coupled to computer 18 via communication channels 20 to assist in verifying the inventory item. The scale may be embedded within platform 52, tared and placed underneath the platform or otherwise spaced apart from the platform, for example, placed underneath picking area 30. Thus, when an item is placed on the scale, the items weight may be determined and transmitted to computer 18. If the weight is not commensurate with the expected weight of the item, processor 18 may request that scanner 60 scan the item to determine the product type and/or the desired end location (e.g., individual consumer container) of the item. The item may alternatively be deposited in a separate end location for further processing.

Figure 2B:
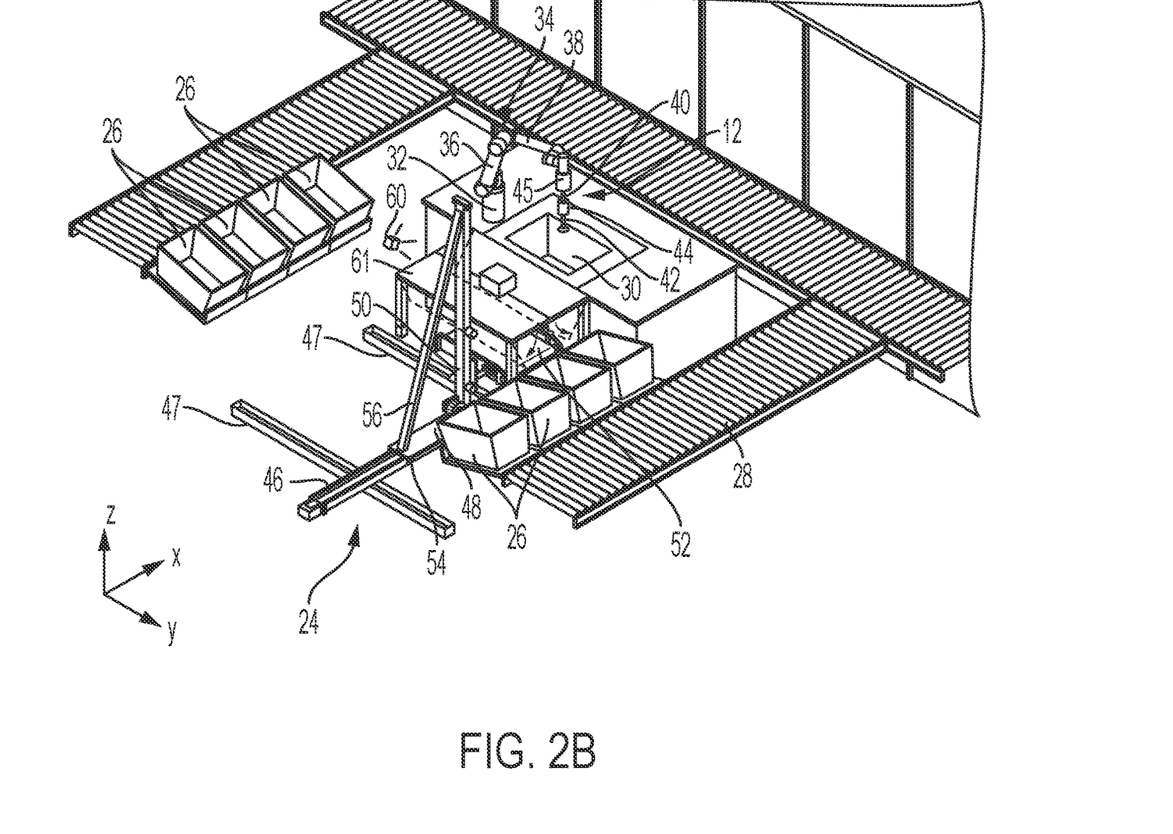
FIG. 2B is a perspective view of an exemplary robotic picking and/or sorting station with an intermediate delivery mechanism schematically shown in FIG. 1.

Referring to FIG. 2B, system 10 may further include an intermediate delivery mechanism 61 communicatively coupled to processor 18 to transfer inventory from the picking arm 34 of robot 12 to platform 52. Intermediate delivery mechanism 61 may be a table like device having bomb bay doors. Intermediate delivery mechanism 61 is preferably positioned adjacent to picking area 30. Scanners 60 and the load measuring device may be incorporated within intermediate delivery mechanism 61 or positioned near the intermediate delivery device to streamline the process of verifying an item before the item is received by platform 52. Although intermediate delivery mechanism 61 is illustrated in FIG. 2B as being a table with bomb bay doors, it will be appreciated that any other intermediate delivery mechanism such as a chute, conveyer belt, push tray or the like, may be used for the same purposes. In some embodiments, intermediate delivery mechanism 61 may also be used to guide the item onto a particular location of platform 52. For example, after processor 18 has verified the item and knows the size of the item, processor 18 can control the angle and speed in which the doors of the bomb bay device open, to ensure that the item is dropped centrally on platform 52.

Platform 52 may additionally include sensors (such as beam break sensors) to determine if the target item is hanging off one of the sides of the platform. If the sensor is activated, processor 18 can instruct the push tray or crossbelt to actuate and move the item towards the center of the platform, thereby preventing the item from falling off the platform or colliding with external structures. Alternatively, bumpers, tapered guide surfaces or brushes (not shown) may be used to push hanging items back onto platform 52. Such devices may be provided on either side of track 46, for example, to passively adjust hanging items as platform 52 moves passed the bumpers or guide surface.

Figure 3:
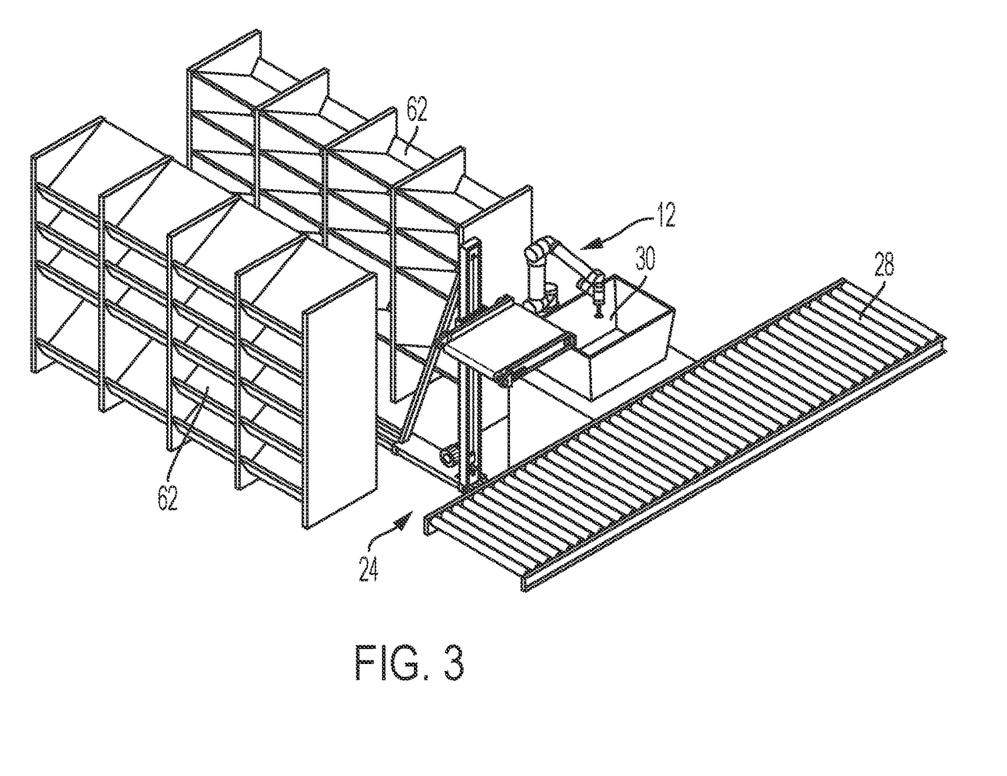
FIG. 3 is a perspective view of another exemplary robotic picking and/or sorting station schematically shown in FIG. 1.
Figure 4:
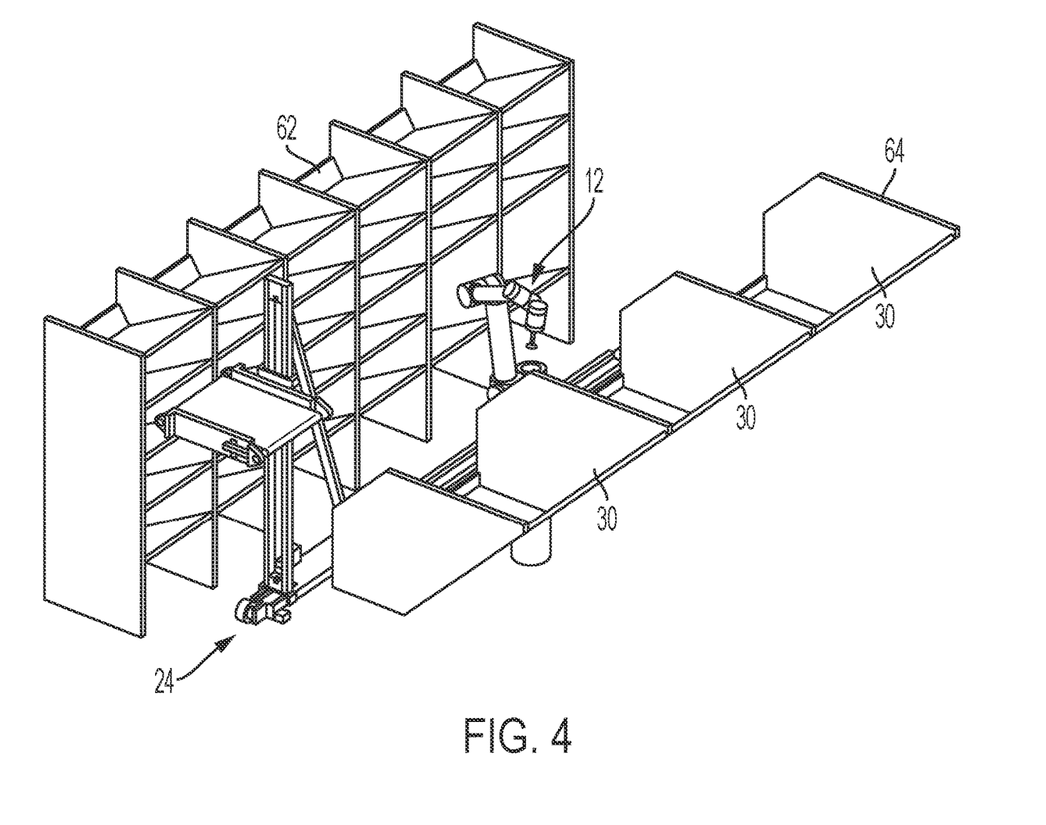
FIG. 4 is a perspective view of yet another exemplary robotic picking and/or sorting station schematically shown in FIG. 1.

FIGS. 3 and 4 illustrate exemplary alternative robotic picking/sorting stations. In these alternative embodiments, robot 12 and shuttle device 24 are as described above with respect to FIG. 2A. In the embodiment illustrated in FIG. 3, however, the containers of FIG. 2A are replaced by a plurality of stacked cubbies 62 located on both sides of the track 46 of shuttle device 24. Each one of cubbies 62 may correspond to an individual consumer's order. The cubbies may include an open backside through which the picked items may be deposited. As shown in FIG. 3, the shelf of each cubby may be sloped toward an open front side having a ledge. Thus, when an item is deposited into the cubby, the item will slide along the shelf until it contacts the ledge. The item may then be easily retrieved for subsequent packaging. In some embodiments, the unit of cubbies 62 may include wheels or another mechanism to assist in moving the unit to another area of warehouse 14 for further processing. Alternatively, after a particular cubby 62 has been filled with the contents of a particular order, the products may be deposited on platform 52 and transported for further processing.

The robotic station illustrated in FIG. 4, replaces the second stack of cubbies 62 shown in FIG. 3 (e.g., the cubbies located on one side of track 46), with a picking chute 64 having a plurality of picking areas 30. Items may be transported to picking chute 64 using any known method, including those methods described above, and placed into any one of the picking areas 30 at random or through a pre-sorting process. It will be appreciated that FIGS. 3 and 4 merely illustrate exemplary robotic picking stations and that robot 12 and shuttle device 24 may be used in either of these sorting stations, or any alternatively configured sorting station, to efficiently sort items into a plurality of end locations corresponding to individual orders.

Figure 5A:
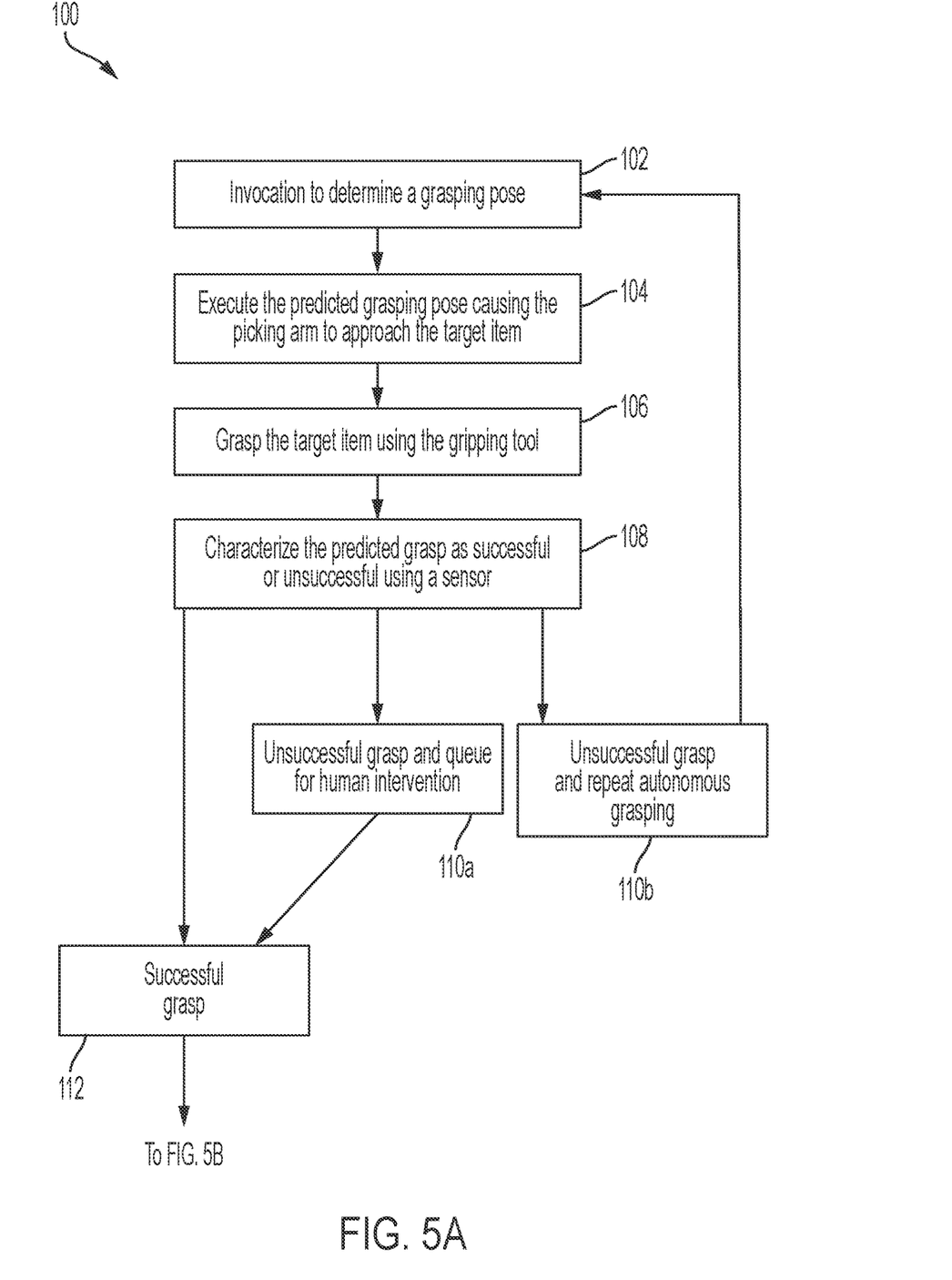
FIGS. 5A-5C is a flow chart showing a method of operating the robotic picking and/or sorting station of FIGS. 2A and 2B.
Figure 5B:
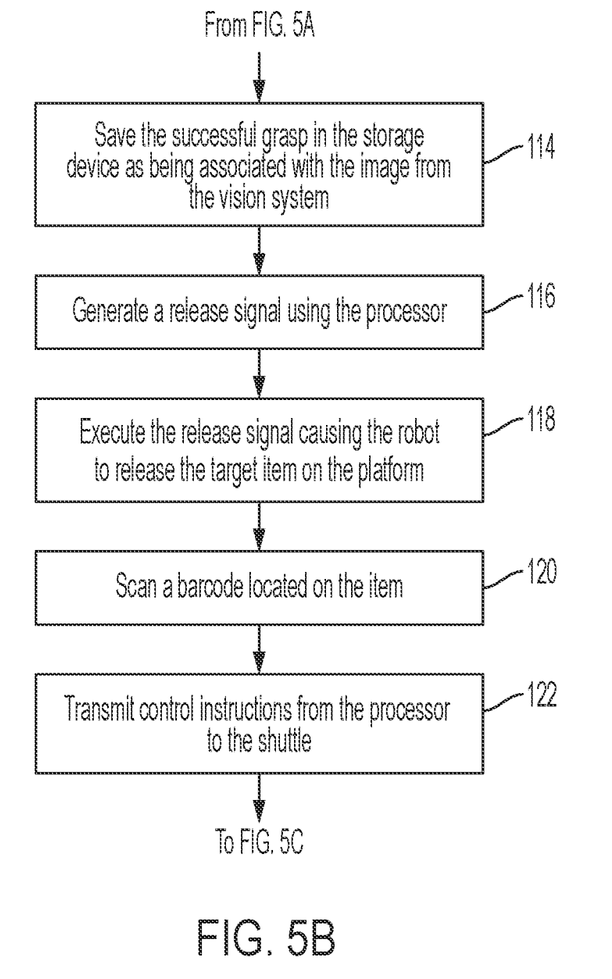
Figure 5C:
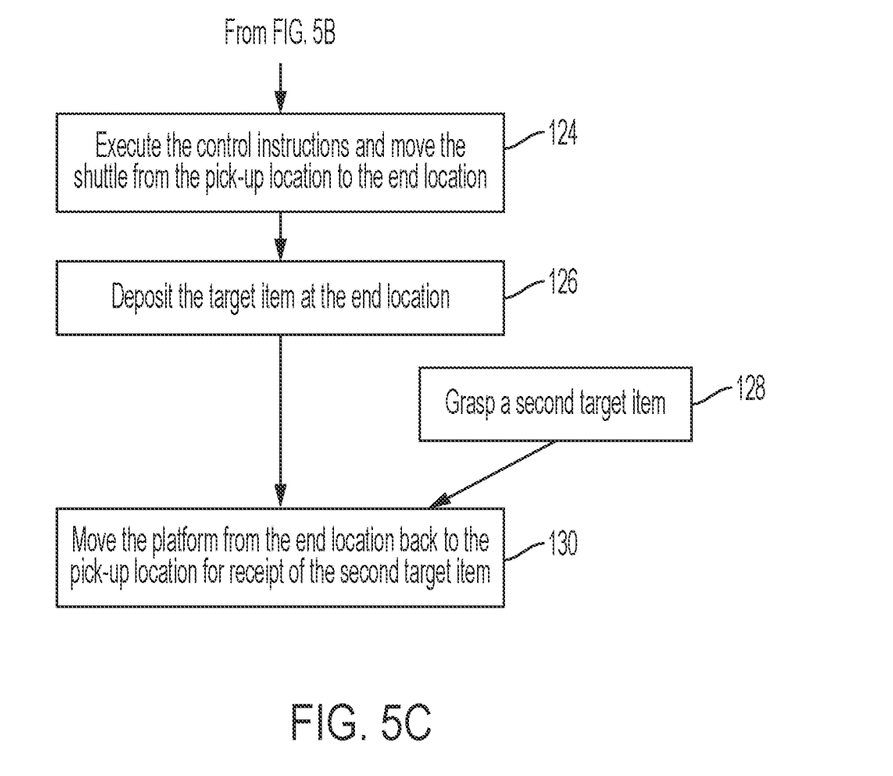

Use of system 10 to pick and sort inventory items will now be described with reference to FIGS. 1-6. Inventory may be transported to picking area 30 by a human, robot, automated storage retrieval system (ASRS), goods-to-person/robot system, conveyer belt, a combination of the foregoing, or any other known mechanism for transporting inventory within a warehouse. Referring to FIGS. 5A-5C, method 100 begins, for example, at 102, in response to an invocation by processor 18 to determine a grasping pose. Referring to FIG. 6, the process for determining a grasping pose 200 may begin, at 202, with a command from processor 18 that instructs vision device 44 to capture an image of picking area 30. The image may then be transmitted, at 204, over network or non-network communication channels 20 to processor 18. Upon receipt of the image, computer 18 may analyze the item poses of the items contained within picking area 30. The item poses can be specified in information that represents item position, shape, orientation, posture, textures, stiffness or the like.

From this information, at 206, processor 18 selects the next item to pick (i.e., the target item). The target item may be autonomously selected by processor 18, after analyzing the image, and predicting the item in which robot 12 has the best, or a high likelihood, of successfully grasping. At 208, processor 18 then executes one or more grasping pose detection algorithms (which can be neural networks or machine learning algorithms stored on storage device 22) to predict one or more grasping pose candidates. The processor may then implement a policy, at 210, which may utilize one or more metrics, checks and filters to select one or more of the predicted grasping pose candidates for robot 12 to execute sequentially or to add to its queue. Then, at 212, processor 18 produces, makes, or generates a signal including processor readable information that represents the selected grasping pose and sends the signal through communication channels 20 to robot 12.

Referring back to FIGS. 5A-5C, after robot 12 receives the selected grasping pose signal, the robot executes the signal, at 104, causing picking arm 34 to autonomously perform the selected gasping pose. That is, gripping tool 42 approaches the target item, as instructed by processor 18, and contacts the target item. As gripping tool 42 contacts the target item, the lip of the gripping tool may deform and conform to the surface of the product as a pneumatic suction force is applied to grasp the target item at 106. With the target item grasped, the picking arm 34 may then lift the target item from picking area 30. At this time, the platform 52 of shuttle device 24 is located in the pick-up location (e.g., a location adjacent to picking area 30). As used herein, when describing the location of platform 52 relative to the picking area 30, the term adjacent means that the platform is in close proximity or within two feet of the picking area in a lateral direction (x-y plane), and preferably, less than 6 inches (as shown in FIGS. 2A and 2B). Thus, if the grasped item falls in transit from picking area 30 to platform 52, the item will either fall back into the picking area (onto intermediate delivery mechanism 61 (if used)) or onto the platform of shuttle device 24, rather than onto the warehouse floor where it is difficult for robot 12 to recover the item. In other embodiments, however, this objective may be accomplished by indirectly coupling platform 52 and picking area 30 through the use of another intermediate delivery mechanism such as a chute, a conveyer, a push tray and the like. In this manner, picking area 30 and the pick-up location of platform 52 may be spaced a greater distance apart from one another than 2 feet, so long as the picking area and the platform are indirectly coupled via the intermediate delivery mechanism to prevent the item from unintentionally dropping onto the warehouse floor.

After the grasping attempt, sensor 45 characterizes the grasp, at 108, as either successful or unsuccessful. That is, if the picking arm 34 of robot 12 is able to successfully grasp and remove the target item from picking area 30, sensor 45 will characterize the grasp as successful and transmit a successful grasp signal to processor 18 via communication channels 20. On the other hand, if the picking arm 34 of robot 12 is unable to remove the target item from picking area 30, or the picking arm drops the target item before the processor 18 instructs robot 12 to release the item on the platform, sensor 45 will characterize the grasp as unsuccessful and transmit an unsuccessful grasp signal to the processor via communication channels 20. Upon characterizing the grasp as unsuccessful, processor 18 can either: (1) immediately signal to teleoperator interface 16, at 110*a*, and request human intervention; or (2) attempt to determine a new grasping pose, at 110*b*, to autonomously pick up the target item based upon a new or modified grasping pose. If processor 18 elects to autonomously determine a new grasping pose, the steps described above, with respect to FIG. 6, may be repeated until either the grasp is characterized as successful, at 112, or until human intervention is requested at 110*a*.

If processor 18 signals for human intervention, the signal may be sent directly or indirectly to the teleoperator interface 16. In situations in which teleoperator interface 16 is communicatively coupled to a plurality of robots 12, each of the robots may be indirectly coupled to teleoperator interface 16 via a 'broker'. The broker may be part of processor 18, or a separate processor, tasked with ordering each robot's help request within a queue of the teleoperator interface. The broker may run an algorithm to determine a 'needs help score' to determine the priority of the queue. The algorithm may be based on several factors including number of prior grasp failures, level of grasping difficulty, and the like.

Once the signal has been received by teleoperator interface 16, a human operator can remotely pilot the picking arm 34 of robot 12 and direct the picking arm to execute a specified grasping pose to grasp the target item. Specifically, the human operator can view the items on the output device (e.g., the display) of teleoperator interface 16, instruct robot 12 to change gripping tools 42, if necessary, and directly control the picking arm 34 of robot 12 to grasp the target item by manipulating the input device of the operator interface. The human operator may also prompt picking arm 34 to grasp a target item in combination with an automated motion sequence calculated by a motion planner. In this manner, the human operator may simply select a pixel on the image feed representative of the location that the robot should grasp while processor 18 autonomously determines and instructs robot 12 to execute a selected grasping pose as described above with reference to FIG. 6.

Sensor 45 can then optionally characterize the grasp as either successful or unsuccessful as described above at 108. The human operator can additionally, or alternatively, make the same characterization. If sensor 45 (or the human operator) characterizes the grasp as successful, the grasping pose used to grasp the target item may be saved within storage device 22, at 114, for future use. Robot 12 can thus learn to infer or predict new grasping poses to improve automation of the grasping process.

After the item has been successfully grasped, either autonomously or via manually piloted instructions, processor 18 can optionally produce, make or generate a signal, at 116, that includes processor readable information and that represents a release pose and send the signal through communication channels 20 to robot 12. When the release pose is executed by robot 12, at 118, the robot may release the target item at a particular location on platform 52 and/or onto the platform in a particular orientation. The release of the target item in this manner can aid in the subsequent transference of the target item from platform 52 to order container 26 or another other end location such as cubby 62. This advantageously allows the items to be placed in such a way that the item enters the sorting location in a more reliable manner, for example, a particular orientation. Similarly, in instances in which picking area 30 is indirectly coupled to platform 52 via an intermediary delivery mechanism such as a chute, conveyer belt, bomb bay door device, push tray, or other delivery mechanism, the picking arm 34 of robot 12 may deposit the target item onto the intermediate delivery mechanism in an orientation that increases the likelihood that the target item will deposited centrally on the platform and received by the platform in a desired orientation.

Once the target product has been picked, and either before or after the item has been placed on the platform 52 of shuttle device 24, at 120, the item may optionally be weighed and/or scanned using scanners 60 to verify the target product. In the embodiment in which the scale is placed under picking area 30, as soon as the item is picked, processor 18 can automatically determine the weight of the object by calculating the difference in mass of the picking area pre and post pick (e.g., the weight of the picked item is determined by subtracting the mass of the picking area after the item is picked from the mass of the picking area before the item was picked). Because scanner 60 are communicatively coupled to processer 18 via communication channels 20, the processor can scan the picked item to verify the proper end location of the target product and transmit a control instruction to the shuttle, at 122, to instruct the shuttle to deposit the target item within a specific order container 26. After the control instruction has been transmitted to shuttle 24, the control instruction may be executed, causing the base 48 of shuttle device 24 to slide along track(s) 46, 47, platform 52 to slide along post 50 and/or lateral extension 58 to laterally move the platform relative to the post to position the platform adjacent to the specified end location. It will be appreciated, that none of these movement steps need to occur if the pick-up location is disposed adjacent to the desired end location. For example, the dispensing mechanism (e.g., pivoting of platform 52, or movement of the push tray or the cross-belt) may actuate to dispense the target item from the platform at the desired end location without the platform moving in the x, y or z-directions. However, any one of the aforementioned movement steps, or a combination of the same, may occur as is necessary to deposit the target item into the desired order containers.

With the platform 52 positioned adjacent the end location, the platform autonomously dispenses the target product in order container 26, at 126, as instructed by the control instructions received from processor 18. The target item may be dispensed from platform 52 by pivoting the platform from a transport position in which the platform is substantially parallel with a ground surface to a delivery position in which the platform is angled toward the ground surface. Alternatively, the target item may be dispensed, for example, as a result of movement of the push tray or cross-belt toward container 26. After the target item has been deposited into container 26, the platform 52 of shuttle device 24 returns from the end location to the pick-up location, thus concluding the 'moving step' which is defined as beginning when the platform leaves the pick-up location and ending when the platform returns to the pick-up location after depositing the target item at the end location.

The above described process may be repeated a second time, referenced generally at 128, to pick and sort a second target item. The second target item is preferably grasped during the moving step of the first pick up item (e.g., prior to the platform returning to the pick-up location, at 130, after depositing the first target item). As a result, the batch-picking or sorting throughput of the system is increased because picking arm 34 and shuttle device 24 share the responsibility of picking the target item from picking area 30 and carrying the item from the picking area to the end location. In fact, when picking arm 34 and shuttle device 24 act in concert, the sorting throughput of system 10 is significantly increased relative to the picking arm acting alone.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A system, comprising:
  a set of first tracks extending in a first horizontal direction;
  a second track provided between the set of first tracks, the second track being slidable along the set of first tracks in the first horizontal direction; and
  a platform coupled to the second track and moveable along the second track in a second horizontal direction transverse to the first horizontal direction, the platform being pivotable between a transport position and a delivery position to displace an item into a select one of a plurality of containers.

2. The system of claim 1, wherein the second horizontal direction is orthogonal to the first horizontal direction.

3. The system of claim 1, further comprising the plurality of containers, the plurality of containers being arranged in a first horizontal row of containers and a second horizontal row of containers.

4. The system of claim 3, wherein the platform is elevated above the first horizontal row of containers and the second horizontal row of containers.

5. The system of claim 1, further comprising a robot including a picking arm arranged to pick the item from a picking area.

6. The system of claim 5, further comprising a scanner.

7. The system of claim 5, further comprising an intermediate delivery mechanism arranged to receive the item from the picking arm of the robot and transfer the item to the platform.

8. A sorting system, comprising:
  a robot including a picking arm arranged to pick an item from a picking area;
  an intermediate delivery mechanism arranged to receive the item from the picking arm of the robot; and
  a shuttle device, comprising:
    a set of first tracks extending in a first horizontal direction;
    a second track provided between the set of first tracks, the second track being slidable along the set of first tracks in the first horizontal direction; and
    a platform coupled to the second track and arranged to receive the item from the intermediate delivery mechanism, the platform being moveable along the second track in a second horizontal direction transverse to the first horizontal direction, and the platform being pivotable between a transport position and a delivery position to displace the item into a select one of a plurality of containers.

9. The system of claim 8, wherein the second horizontal direction is orthogonal to the first horizontal direction.

10. The system of claim 8, wherein the intermediate delivery mechanism includes a surface for receiving the item, and the intermediate delivery mechanism is configured to guide the item onto a location of the platform.

11. The system of claim 8, further comprising a scanner.

12. The system of claim 8, further comprising the plurality of containers, the plurality of containers being arranged in a first horizontal row of containers and a second horizontal row of containers.

13. The system of claim 12, wherein the platform is elevated above the first horizontal row of containers and the second horizontal row of containers.

14. A method of sorting items, comprising:
  picking a first item from a picking area using a picking arm of a robot;
  transferring the first item onto a platform of a shuttle device, the shuttle device including a set of first tracks extending in a first horizontal direction, a second track provided between the set of first tracks, and the platform;
  sliding the second track along the set of first tracks in the first horizontal direction and moving the platform along the second track in a second horizontal direction transverse to the first horizontal direction; and
  actuating at least a portion of the platform from a transport position, in which the first item is disposed on the platform, to a delivery position, in which the first item is displaced into a first container.

15. The method of claim 14, further comprising:
  depositing the item, using the picking arm of the robot, onto a surface of an intermediate delivery device, the intermediate delivery device being configured to perform the transferring step.

16. The method of claim 14, further comprising scanning the first item to determine the first container.

17. The method of claim 14, wherein a base of the robot is immovable relative to the picking area.

18. The method of claim 14, further comprising:
  picking a second item from the picking area using the picking arm of the robot; transferring the second item onto the platform;
  sliding the second track along the set of first tracks in the first horizontal direction and moving the platform along the second track in the second horizontal direction; and
  actuating the at least a portion of the platform from the transport position to the delivery position to displace the second item into a second container.

19. The method of claim 18, wherein the first container corresponds to a first order and the second container corresponds to a second order.

20. The method of claim 18, further comprising batch picking inventory including the first item and the second item from a storage location and transporting the inventory to the picking area.

* * * * *